June 28, 1960     T. W. AUSTIN     2,943,000
HEAT SEALABLE THERMOPLASTIC FILM
Filed March 27, 1958
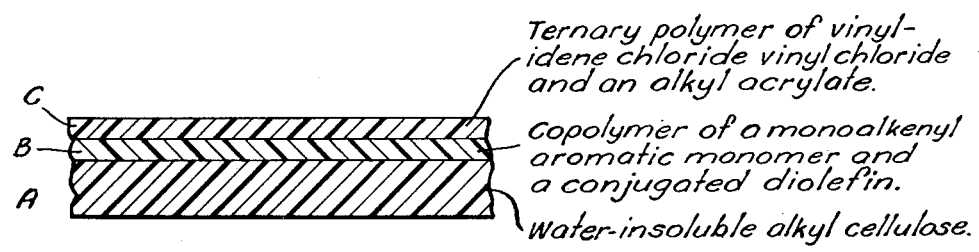
INVENTOR.
Thomas W. Austin
BY
AGENT United States Patent Office 2,943,000
Patented June 28, 1960

2,943,000

HEAT SEALABLE THERMOPLASTIC FILM

Thomas W. Austin, Midland, Mich., assignor to The Dow Chemical Company, Midland, Mich., a corporation of Delaware Filed Mar. 27, 1958, Ser. No. 724,268

7 Claims. (Cl. 117—72)

This invention relates to a process for imparting heat sealing properties to films which are normally incapable of being heat sealed with conventional apparatus. More particularly it relates to a process for conferring heat sealing and other improved properties on such films by means of coatings applied thereto.

One of the problems facing the flexible film converter is the attainment of proper closures and seams for packages which he manufactures. Such closures and seams may be made with pressure sensitive adhesives or with mechanical closures, such as staples. Both of those methods require multi-step manipulations and are usually inadequate when an impervious seal is desired. With many materials which are thermoplastic, the closures and seams may be formed by drawing the edges of the bag or pouch between two heated shoes to provide a continuous, impervious heat seal. Such a heat sealing technique is well adapted and has been universally accepted for use with high speed packaging operations and is inexpensive in operation. The seals are continuous and as impermeable as the material from which the packaging material is made. However, many materials, such as films of ethyl cellulose, although thermoplastic, cannot be self-sealed in such manner. When ethyl cellulose film is attempted to be sealed thermally with the conventional heated-bar sealers, the result is either that no seal is formed, or an unattractive and unsatisfactory mass of molten polymer, or a shirred discontinuous seal due to shrinkage caused by distortion of the orientation of the film. All of those materials are potentially valuable, flexible packaging films, and could achieve widespread use if a satisfactory process for heat sealing them could be found.

It is accordingly the principal object of this invention to provide a process for imparting heat sealing properties to those flexible films which of themselves are incapable of being conveniently heat sealed using conventional apparatus.

The above and related objects are accomplished by the process consisting of the sequential steps of (1) applying to the film a first continuous coating of a film-forming latex of a styrene-butadiene copolymer, (2) drying said coating, (3) applying as second continuous coating over said first continuous coating a film-forming latex of a vinylidene chloride copolymer, (4) drying and fusing said second coating. The invention likewise contemplates the coated films so prepared.

The accompanying drawing illustrates in a cross sectional view the novel packaging film of this invention. In the drawing the legend A identifies the base film and legends B and C indicate respectively the primer coating latex of the monoalkenyl aromatic conjugated diolefin copolymer and the top coating latex of vinylidene chloride vinyl chloride alkyl acrylate as described above.

The substrata which are contemplated as subject materials for use in this invention in the process of this invention are those flexible films, foils, and sheets prepared from ethyl cellulose and similar water-insoluble alkyl cellulose ethers including methyl and propyl celluloses. The ethyl celluloses are preferred as such substrata. As is known with alkyl celluloses the solubility characteristics are closely related to and dependent upon the degree of ether substitution. For example, with the preferred ethyl cellulose the useful and commercially available films, foils, and sheets are those prepared from the cellulose ethers having from about 46 to about 49.5 percent by weight ethoxy substitution. Similar substitutions for other alkyl cellulose ethers will either be known or may be determined by observation of the solubility and other properties of the cellulose ether.

Flexible films may be prepared from the above described thermoplastic materials by thermal fabrication, specifically thermal extrusion. Processes, techniques, and apparatuses for such fabrication are known. Other techniques include the solvent casting or dipping of the compositions from a volatile solvent followed by evaporation of that solvent. Flexible films of these cellulose ethers may be prepared in a variety of gauges, colors, and widths. As commercially available, such films are sold in a thickness of from about 0.003 to about 0.015 inch. Since the modifications contemplated by this invention involve primarily surface phenomena, they are adaptable to any size, shape or thickness where uniform coatings may be applied. The modifications are also useful with other moldings, extrusions, or any other thick section of a rigid or semi-rigid nature. However, with such articles of thick section the need for heat sealability is rather remote. Consequently, the attainment of that property alone may not be justification for the treatment. However, the process results in other advantages as will be described. Thus, it is not intended to limit the process or the resulting articles to any particular shape, although heat-sealable, flexible films are the preferred end-products.

The process consists essentially of the application of two separate coatings in consecutive sequence to the thermoplastic substratum. The first coating is of a film-forming latex of a styrene-butadiene copolymer. Such latexes are sold commercially. As sold the copolymeric component of such latexes is composed of from about 20 to about 70 percent by weight of styrene with the remainder made up of butadiene. It is imperative that any of the coating materials employed in this process should have at least about the same flexibility and elongation as the substratum. Otherwise the coating would crack or split or the article would be damaged in other manner every time a lateral stress was exerted on the article. Such stresses are commonplace in packaging irregularly shaped objects and in packaging with the high speed equipment of the present day. When the copolymer contains appreciably more than about 70 percent styrene the latexes are usually not film forming by simple deposition and when coatings are prepared by special techniques, the resultant coating is too brittle for use herein. When the coating contains appreciably less than 20 percent styrene the coatings lose considerable of their adhesive power and are thus unsuitable for use herein.

The term styrene-butadiene latex has been employed above for ease of description. It is intended that the invention include film-forming latexes generally of a copolymer of any monoalkenyl aromatic monomer and a conjugated diolefin, such as butadiene and the lower alkyl substituted butadienes. By the term monoalkenyl aromatic monomer it is intended to include those compounds having the alkenyl group directly attached to a carbon atom of an aromatic nucleus of from 6 to 10 carbon atoms which compounds may also contain one or more alkyl or halogen substituents on the aryl nucleus. Typical examples of such compounds are styrene, para-methyl styrene, meta-ethyl styrene, ortho-para-dimethyl styrene, ortho-para-diethyl styrene, para-chlorostyrene, isopropyl styrene, ortho-methyl-para-isopropyl styrene, ortho-para-dichlorostyrene, and combinations of the above or of, for example, styrene and alpha-methyl styrene, or of styrene with another monoethylenically unsaturated monomer, such as acrylonitrile. Such copolymeric materials will usually follow the compositional characteristics previously mentioned for the styrene-butadiene latexes.

As indicated such latexes are rather generally available. If other latex is desired it may be easily prepared by known emulsion polymerization techniques. As is well known in that art, many considerations besides copolymer composition enter into the film formability of any latex. Chief among those considerations are particle size distribution and polymeric solids content. It is usually true that a latex should have a particle size distribution of about 2000 Angstrom units or less if film formability by simple deposition is to be attained. Additionally, the latex should contain a minimum of at least about 20 percent by weight of polymeric solids to be film forming. Methods and techniques for obtaining such requisite characteristics are known.

The second coating is deposited from a film-forming latex of a ternary polymer of vinylidene chloride, vinyl chloride, and an alkyl acrylate. Although any of the ternary polymers of that monomeric composition may be employed, it is preferred to employ those containing at least about 70 percent by weight of vinylidene chloride with the remainder made up predominantly of vinyl chloride. Copolymers of that preferred composition exhibit properties, such as low moisture vapor transmission, toughness, clarity, elongation, and the like, that make them peculiarly well adapted for use in flexible film manufacture for packaging purposes. Although less than 70 percent by weight vinylidene chloride may be used, it is done at a sacrifice of most of the above-named properties, and especially of the block resistance. The acrylate is used to internally plasticize or to soften the polymeric material to enhance the latex film forming ability and to improve adhesion of the coating to the first coating. This will usually be achieved with 10 percent by weight or less of the acrylate. When significantly more than 10 percent by weight of acrylate ester is used, the resulting coating does not have the optimum properties for use in packaging. The efficiency of any acrylate in that function is determined principally by the length and chain structure of the alkyl ester group. It is usually true that the greater the bulk of the ester group, the greater will be the plasticization tendency of that ester when employed as herein described. The optimum concentration of copolymerized acrylate within the stated limits may be easily determined by simple preliminary experiment. The remainder of the polymeric material is conveniently composed of vinyl chloride or vinyl acetate.

An example of a useful latex is one prepared by the emulsion polymerization of 75 percent vinylidene chloride, 20 percent vinyl chloride and 5 percent ethyl acrylate.

As with the styrene-butadiene latexes, many of the materials useful for the second coating will be commercially available. If desired they may be prepared by the emulsion polymerization of the appropriate monomers.

Although the above polymeric compositions are most easily obtained through copolymerization methods, it has been found that available latexes may be blended to arrive at a final composition having the above-stated desired composition. Thus, a terpolymer of vinylidene chloride, vinyl chloride, and ethyl acrylate, which has an excessive amount of acrylate for the desired properties, may have blended therein a small amount of another latex of vinyl chloride and vinylidene chloride to adjust the final polymeric composition to that desired. An example of such a blend is one composed of 90 parts of the prior described latex of the ternary polymer and 10 parts of solids of a latex prepared by the emulsion polymerization of 75 percent vinyl chloride and 25 percent vinylidene chloride.

Other useful blends will be apparent to those skilled in the art. Such blends of latexes are frequently useful as a means to increase the block temperature of the coated film. By block temperature is meant the minimum temperature at which two surfaces of film in face to face contact will not slip apart when placed under an applied pressure for a time which is arbitrarily selected. The block temperature is of significance when the film is rolled up on itself and is shipped and stored in such manner. Likewise after conversion to bags and pouches the block temperature assumes an importance not only in shipping and storing, but also in feeding into package filling apparatus. For most commercial applications it has been found that this block temperature should be at least 68° C. when placed under an applied pressure of 1 pound per square inch for 24 hours. In the above illustrations the ternary polymer per se has a block temperature which is slightly below 68° C. when so measured. However, the incorporation therein of only 10 parts of the binary polymer raises the block temperature of the blend to above 68° C. without loss of heat sealability, barrier properties, or any other of the desired characteristics of the ternary.

Each of the coatings of this process may be applied by known coating techniques, including brushing, spraying, roller coating, dipping, or other means. To maintain uniform, reproducible properties and characteristics it is essential that each coating be of substantially uniform thickness. Thus, after application or simultaneously therewith, but before drying, of the latex in each instance there may be used known doctoring means, such as a doctor blade, squeeze rolls, or a planiform stream of air commonly referred to as an air knife, to remove excess latex.

After each coating application the coating is dried and fused into a continuous coherent coating. That drying may occur at room temperature, although it is preferred to employ slightly elevated temperatures of 60° to 70° C. which appreciably shorten the drying step. Temperatures which are significantly higher than 70° C. should usually be avoided, since they tend to destroy or at least to alter the orientation and other properties and characteristics of the substratum.

To achieve heat sealability and other desirable properties it is only necessary that each of the coatings completely cover the surface to be coated. As a practical matter such coatings will, if conventional coating techniques are followed, be of a thickness of combined coating of at least 0.0001 inch. Additionally coatings which are greater than about 0.05 inch are difficult to dry without special apparatus and methods, and impart little or no significant improvement in properties over the less thick coatings. Accordingly, it is preferred to have the combined coatings of a thickness of from about 0.0001 to 0.05 inch.

The articles prepared in accordance with this invention have the functional advantages of laminate-like structures. Thus, the strength, toughness, flexibility and other like properties of the coated articles are determined mainly by the substratum. Other properties, such as heat sealability, barrier characteristics, and solubility, are determined by the second coating. The first or base coating functions to maintain the second coating and substratum in continuous adhesive relationship. Thus, both the composition of each coating and their sequence of application are critical to the success of the process. The materials described herein as useful for first coatings will adhere to the substratum and may be heat sealed if attempted immediately after coating application. However, these materials exhibit prohibitively low blocking temperatures and additionally lose their heat sealability upon aging. For example a polystyrene film coated with a dried, fused coating of a styrene-butadiene latex of the type herein described will have a great tendency to adhere to itself when wound in rolls. That film will be very difficult to unroll without causing severe impairment of the coating.

Additionally it has been found that such coatings are initially capable of heat sealing but that this capacity is lost upon aging for a relatively short time of one or two weeks.

The materials described as useful for the second coating are not capable of continuous adherence to the substrata contemplated in this invention. The best continuous adherence has been found when the second coating is applied over the first coatings. It has been averred that certain surface treatments, such as chlorination, scrubbing, heating to slightly elevated temperatures prior to coating, and precoating with solvents, plasticizers and wetting agents, which when applied to the unmodified substratum will improve the adhesion of subsequently applied coatings and laminae. Additionally it has been suggested that the incorporation of solvents, wetting agents, and the like, into coating composition will result in improved adhesion of the coating to the substratum. None of these latter techniques, however, resulted in satisfactory adhesion of the second coating to the films and other articles which lacked the first coating. It was further found that when the latexes of each coating were blended and that blend applied to the film, that the block temperature remained low, and that the heat sealability and adhesion were erratic.

The articles may be treated in accordance with this invention on either one or both surfaces depending upon the end use for which the article is to be employed. The articles after treatment may have impressions printed or stamped thereon usually without affecting the barrier, heat sealability, or other properties. Also the coated films may be used with conventional wrapping and packaging machinery without serious effect on the coating.

The operation of the process and the advantages thereof will be more apparent from the following illustrative example wherein all parts and percentages are by weight unless otherwise indicated.

*Example*

A sample of ethyl cellulose film of a thickness of about 0.003 inch was prepared from an ethyl cellulose having an ethoxy substitution of about 46.5 percent. This film was coated with a film-forming latex of 67 percent styrene and 33 percent butadiene. The solids content of the latex used was 25 percent of the total weight of latex. The coating was achieved with a No. 8 wire-wound Meyer rod. The latex coating was allowed to air dry until clear. After dry a second latex coating was applied over the first coating in identical manner. The second latex was prepared by the emulsion polymerization of 75 percent vinylidene chloride, 20 percent vinyl chloride, and 5 percent ethyl acrylate. The latex contained 25 percent polymeric solids. The second coating was air dried until clear. The combined coating thickness was 0.0001 inch. The result was a clear, glossy, flexible film. The film was heat sealed to itself by placing the coated surfaces in contact and passing between the electrically-heated jaws of an Amsco heat sealer. Continuous heat seals could be made at a jaw temperature of 85° C. Unmodified films required a temperature of 175° C. The modified film was tested for heat stability in an Atlas Fadeometer and did not discolor after 100 hours' exposure. The adhesion was checked by trying to separate the coating from the substratum using pressure sensitive tapes. No separation could be achieved in this manner.

After 35 days' storage the coated film was still heat sealable and still had the other desirable properties.

Films were prepared in like manner having coating thicknesses ranging up to 0.033 inch with similar properties.

By way of contrast when the film was coated with only the styrene-butadiene latex described above the resultant film when rolled exhibited severe adhesion and blocking and could not be easily unwound. Also after two weeks aging the coated films were no longer heat sealable.

In further contrast when the film was coated with only the vinylidene chloride latex, the coating was readily separated from the film using pressure sensitive tapes. Similar results were observed when the unprimed film was coated with the latexes of vinylidene chloride-acrylonitrile of vinylidene chloride-vinyl chloride; vinylidene chloride-butyl acrylate; vinylidene chloride-methyl acrylate; vinyl chloride-butyl acrylate; vinyl chloride-methyl acrylate; and ethyl acrylate-methyl methacrylate.

What is claimed is:

1. A heat sealable article based on a substratum which has been fabricated of a water-insoluble alkyl cellulose, said article consisting of a first dried continuous coating in continuous adherent relationship to said substratum, said dried continuous coating consisting essentially of a copolymer of a monoalkenyl aromatic monomer and a conjugated diolefin and a second dried continuous coating in continuous adherent relationship to said first coating, said second coating consisting essentially of a ternary polymer of vinylidene chloride, vinyl chloride and an alkyl acrylate.

2. The article claimed in claim 1 wherein said substratum is a flexible film.

3. The article claimed in claim 1 wherein said alkyl cellulose is ethyl cellulose.

4. The article claimed in claim 1 wherein said substratum is coated on one surface.

5. The article claimed in claim 1 wherein said first dried continuous coating is composed of a copolymer of styrene and butadiene containing from about 20 to about 70 percent by weight of styrene.

6. The article claimed in claim 1 wherein said ternary polymer is composed of at least 70 percent by weight of vinylidene chloride, of not over 10 percent of an alkyl acrylate, with the remainder made up of vinyl chloride.

7. The article claimed in claim 6 wherein said ternary polymer is composed of 75 percent by weight of vinylidene chloride, 10 percent by weight of vinyl chloride, and 5 percent by weight of ethyl acrylate.

References Cited in the file of this patent

UNITED STATES PATENTS

| | | |
|---|---|---|
| 2,525,676 | Hoffman | Oct. 10, 1950 |
| 2,662,867 | Hoertz | Dec. 15, 1953 |
| 2,819,985 | Cobbs | Jan. 14, 1958 |

UNITED STATES PATENT OFFICE
CERTIFICATE OF CORRECTION

Patent No. 2,943,000                                June 28, 1960

Thomas W. Austin

It is hereby certified that error appears in the printed specification of the above numbered patent requiring correction and that the said Letters Patent should read as corrected below.

Column 6, line 52, for "10 percent" read -- 20 percent --.

Signed and sealed this 11th day of April 1961.

(SEAL)
Attest:
ERNEST W. SWIDER                              ARTHUR W. CROCKER

Attesting Officer                                    Acting Commissioner of Patents